Nov. 6, 1956
H. PFLEUMER
2,769,205
EXPANDED CELLULAR RUBBER WITH ELLIPTICAL
CELLS AND METHOD OF MAKING
Filed April 3, 1952
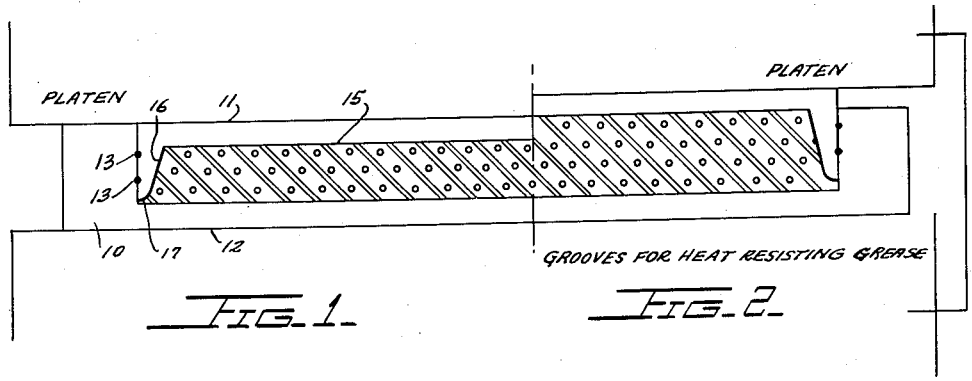
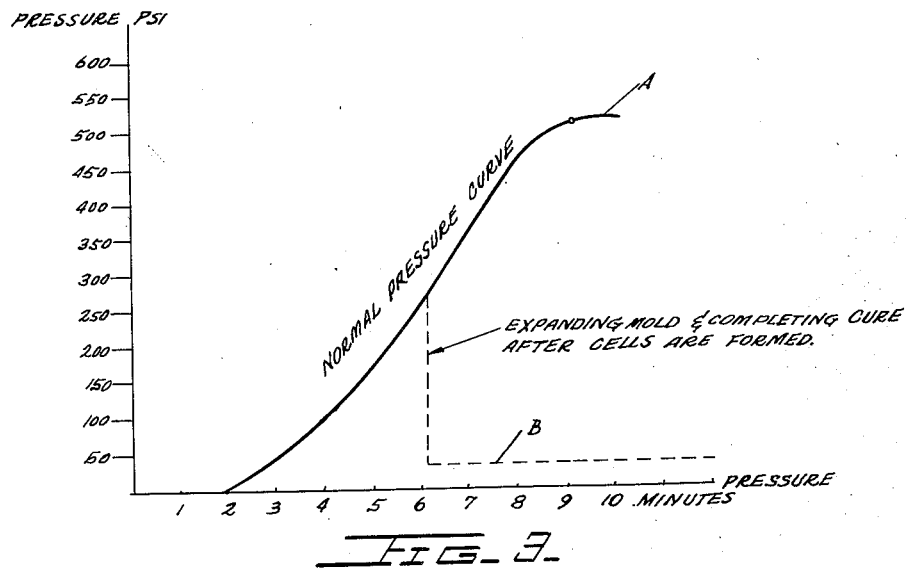
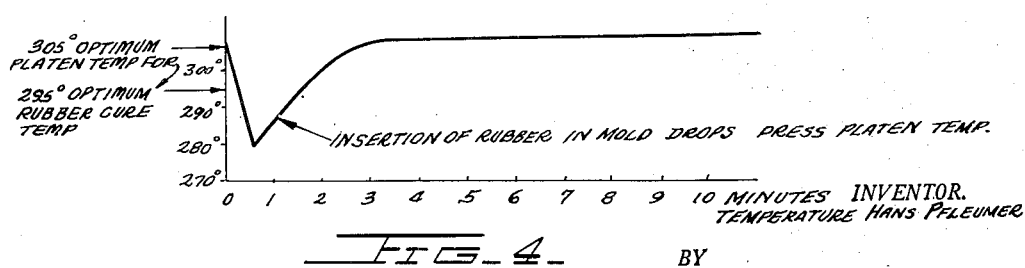
INVENTOR.
HANS PFLEUMER
BY
Ostrolenk & Faber
ATTORNEYS

United States Patent Office 2,769,205
Patented Nov. 6, 1956

2,769,205

EXPANDED CELLULAR RUBBER WITH ELLIPTICAL CELLS AND METHOD OF MAKING

Hans Pfleumer, New Brunswick, N. J., assignor to Rubatex Products, Inc., New York, N. Y., a corporation of Delaware Application April 3, 1952, Serial No. 280,284

2 Claims. (Cl. 18—53)

My present invention relates to a single stage process for making closed cell cellular rubber in an expanding mold and is thereby an improvement over the processes set forth in Patents Nos. 2,422,797, 2,421,831, 2,420,815, 2,374,233 and 2,335,649 which describe the basic process.

In the known single stage chemical blow process a mold in the shape of a rectangular shallow pan is completely filled with rubber to be expanded. The edges of the pan are dished to allow the expanding rubber to pop out of the mold easily and without damage to it at the moment of opening the press immediately upon ending the cure. The resulting cellular rubber in its best quality is then about one part rubber and one part nitrogen gas which developed from the blowing agent admixed to the rubber and the rubber itself is fully vulcanized to an elastic state to all practical extent. A short after treatment either in a hot platen press without mold or in a hot oven is then applied to temper the expanded sheet, but it could hardly be termed a secondary vulcanization.

It can be shown experimentally that the cell pressure developed during the cure rises towards the end to 500 pounds per square inch. Under this compression the cell rubber is vulcanized and thereafter expansion to a larger volume is forced upon the set rubber upon opening of the platen press. The heat of the rubber allows for a certain expansion. However, a slight overcure will inhibit the expansion, and it is this sensitivity to the correct time and heat which causes considerable difficulties in producing sheets of uniform size.

In measuring the cell pressure during the cure of the sheet which is either cold or handwarm placed into the mold between the heated platens, it is found that the first two minutes are consumed in bringing the rubber up to the vulcanizing heat. From then on the blow occurs in an even curve upwards levelling off towards the end of the curing cycle.

In my process I aim at a slight volume expansion of the rubber when about half through the blow. This has distinct advantages over the known single stage process. Actually, it is a two-stage process executed in a single curing operation. The rubber is not transferred from the first mold to a bigger mold. Instead, I accomplish this operation by an expanding mold. The mold is constructed to expand only in one dimension, that is in height. The mold is so designed that during its expansion no leak or flash of rubber occurs.

In the prior processes where the cell pressure is very high, flash cannot be eliminated and comprises a complete loss of rubber and reacts upon the edge quality of the cellular sheet.

In the process I propose the rubber is expanded when cell formation is well on its way, yet the blow pressure is only about half as high. When at this point the rubber is expanded, the internal pressure of the cells instead of rising further falls to a moderate degree and flash is thereby prevented. The ram pressure need not be as high or, as an alternative, larger areas may be blown with the same ram pressure.

When the cells are first formed they are of a spherical or globular shape. By the single dimensional expansion in the mold they are drawn out into ellipsoidal shape, the long axes directed through the thickness of the sheet, which characteristic will be permanent with the completely expanded sheet.

Thus, the primary object of my invention is the production of an expanded cellular rubber sheet having elliptical cells and a clean edge.

Another object of my invention is a method utilizing a mold expandable in one dimension to reduce flash and provide an expanded cellular rubber sheet having elliptical cells.

My invention is also adapted to a true two-stage operation where expansion to low density or formation of light weight hard board is desired. Thus, the process here described may be used as the first stage of the two stage operation to produce a partially expanded and partially vulcanized sheet with ovoid cells. Thereafter this partially expanded and vulcanized sheet may be placed in another mold for full expansion to final form and for complete vulcanization.

The foregoing and many other objects of my invention will become apparent in the following description and drawings in which:

Figure 1 is a cross-section through an expanding mold using my novel method.

Figure 2 is a cross-section through the mold of Figure 1 in expanded condition.

Figures 3 and 4 are curves showing the operation of my invention.

Referring to Figure 1, the mold comprises a substantially rectangular container 10 which is mounted between the press platens 11 and 12, the interior mold wall being provided, where required, with grooves 13, 13 for the application of a heat resistant grease.

The mold is provided also with an inverted pan 15 having sloping sides 16 and a lip 17 which is a close fit in the mold wall.

In prior processes the mold was not expandable. Therefore, when the chemical blow occurred, the internal cell pressure rose to approximately 500 pounds per square inch, creating the cellular structure but placing the rubber sheet under this internal restrained pressure, that is, the pressure was restrained by a hydraulic ram holding the platens together.

In the present invention, when the blow occurs, the pan 15 is driven upwardly against the platen 11 permitting some expansion to occur and actually dropping the internal pressure to less than 50 pounds per square inch.

Thereafter the curing process proceeds to take place.

When the platens are now open, the hot rubber which is no longer at the prior 500 pound per square inch internal pressure but is at the reduced internal pressure of less than 50 pounds per square inch does not flash out and does not spring out in deformed condition.

Thus, when the blow occurs the rubber in the mold is permitted to expand by the distance to which the pan 15 may rise. The expansion in other directions is limited by the fixed mold walls.

In theory, the optimum condition would be obtained by a three-dimensional expansion, but in practice this would lead to a mold which is physically too complex. Consequently, the expansion in a single direction during the blow is permitted.

This uni-directional expansion leads to elliptical cells rather than truly spherical cells, but the added resilience given the rubber in one direction by the elliptical nature of the cells makes this rubber construction particularly valuable for use in those instances where resilience is required primarily in one direction, as, for instance, where the expanded closed cell cellular rubber is to be used in the making of shoe soles.

Obviously both the mold and the pan should be of the same material so that the coefficient of expansion will be the same and a close fit will be obtained at all times so that any flash that might otherwise occur will be prevented.

The internal edges of the pan or cover are rounded off to prevent damage to the rubber sheet, and as pointed out above, the inner sides of the pan or cover are sloped to permit the rubber readily to be taken out.

In Figure 3 I have shown a curve illustrating the operation of my invention. The solid line A of the curve shows the usual pressure curve in prior processes.

The chemical blow first becomes noticeable at the end of two minutes and rises rapidly to 250 pounds per square inch at the end of six minutes. At this time according to my invention, sufficient pressure is generated to raise the internal pan 15, thereby dropping the pressure as indicated at curve B to below 50 pounds per square inch and maintaining this lower internal pressure throughout the remainder of the cycle. During the first five or six minutes of the cure the press platens are held securely together by the ram as in the ordinary process. However, at the predetermined moment the ram pressure is rapidly released to allow the predetermined expansion. The press platens themselves are arrested when the proper clearance has been reached.

In Figure 4 I have shown a curve giving the platen temperature throughout the cycle. I have found that the optimum rubber cure temperature is 295°. To obtain this average condition through the rubber, a platen temperature of 305° F. is required.

The insertion of the rubber mass initially drops the platen temperature to approximately 280° and it then requires approximately three minutes to return to its original 305° temperature. As it approaches this 305° temperature, the cycle begins as shown in the curve of Figure 3 and continues throughout.

Thus, by my invention I provide a novel method for obtaining a closed cell cellular structure and uniform sheets with clean edges which are not marred in any way by the manufacturing process, the said sheets having internal elliptical cells.

The process as described for a single stage cure is also applicable to a two-stage process. It is very useful therein because of the higher cell pressures which are developed in order to obtain the larger expansion to a lower density achieved by the two stage process.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. The method of making closed cell cellular expanded rubber, comprising the steps of preparing a rubber mix including a finely dispersed material which, on the application of heat, generates a gas, subjecting the rubber mix to a temperature sufficient to generate said gas, partially curing said rubber mix during generation of said gas and confining said rubber mix against expansion under the relatively high pressure of said generated gas, permitting said internally generated gas to expand said rubber mix to a limited extent in one direction thereby reducing said gas pressure from said relatively high value to a substantially reduced, slightly superatmospheric value, and confining the expanded rubber mix against further expansion under said reduced gas pressure while fully curing the same.

2. The method of making closed cell cellular expanded rubber, comprising the steps of preparing a rubber mix including a finely dispersed material which, on the application of heat, generates a gas, subjecting the rubber mix to a temperature sufficient to generate said gas, partially curing said rubber mix during generation of said gas and confining said rubber mix against expansion under the relatively high pressure of said generated gas, permitting said internally generated gas to expand said rubber mix to a limited extent in one direction thereby reducing said gas pressure from said relatively high value to a substantially reduced, slightly superatmospheric value and to form elliptical internal cells, and confining the expanded rubber mix against further expansion under said reduced gas pressure while fully curing the same.

References Cited in the file of this patent

UNITED STATES PATENTS

| Number | Name | Date |
|---|---|---|
| 1,045,234 | Willis | Nov. 26, 1912 |
| 1,352,739 | Egerton | Sept. 14, 1920 |
| 1,515,475 | Goodwin | Nov. 11, 1924 |
| 1,877,527 | Moran | Sept. 13, 1932 |
| 2,133,019 | Campbell | Oct. 11, 1938 |
| 2,198,634 | Richter | Apr. 30, 1940 |
| 2,283,316 | Cooper | May 19, 1942 |
| 2,287,193 | Overstreet | June 23, 1942 |
| 2,376,653 | Boyer | May 22, 1945 |
| 2,421,831 | Cooper | June 10, 1947 |